United States Patent Office.

JOHN PICKLES, OF WIGAN, ENGLAND.

Letters Patent No. 94,509, dated September 7, 1869.

IMPROVED PROCESS OF CONCENTRATING AND GRANULATING SACCHARINE LIQUIDS

The Schedule referred to in these Letters Patent and making part of the same.

*To all whom it may concern:*

Be it known that I, JOHN PICKLES, of Wigan, in the county of Lancaster, England, have invented a new and useful Process for Granulating Saccharine Liquids; and I hereby declare the following to be a full, clear, and exact description thereof, which will enable others to make and use my invention, reference being had to the accompanying drawings, forming part of this specification, in which is shown a sectional elevation of the device or machine through which my process is accomplished.

The purpose of this invention is to provide a new and improved process for granulating or crystallizing liquids containing saccharine matter; and It consists in raising the said saccharine liquid, when in a partially-sugared or crystallized state, to the necessary height in a tower, building, or cylinder, and then allowing the said liquid to fall through the height of the said tower, cylinder, or building, the atmosphere in the said tower, cylinder, or building, having previously been heated to the proper degree.

The liquid is allowed to fall through the said tower, &c., from a sieve, or rose, or other similar device, located at or near the top thereof.

The liquid is first elevated, or carried up by forcing, pumping, or other convenient means, and it is there poured into a receptacle, as may be desired.

Passing through the said rose or screen, the said liquid is divided into minute streams, drops, or quantities, in which condition, falling through the heated atmosphere of the said tower, &c., and the particles thereof becoming divided by the resistance of the air, and the watery particles being evaporated by this, and the condition of the atmosphere therein, the saccharine elements of the said liquid arrive at the bottom of the said tower, &c., in a dry, crystallized, or granulated state, or in the form of sugar.

The building, &c., may be heated by any of the well-known methods, and it is not my purpose to claim any particular one.

I do not claim reducing saccharine liquids to the state of sugar by evaporation.

What I claim as my invention, and desire to secure by Letters Patent, is—

The process of placing saccharine liquids in the proper position, and then allowing them to fall through a strainer, &c., through the proper height, wherein the atmosphere has been previously properly heated, substantially as and for the purposes set forth.

JOHN PICKLES.

Witnesses:
 JNO. NICHOLLS,
 WM. F. LIGHTHALL.